United States Patent
Zhang et al.

(10) Patent No.: US 12,045,653 B2
(45) Date of Patent: Jul. 23, 2024

(54) FIELD SPECIALIZATION TO REDUCE MEMORY-ACCESS STALLS AND ALLOCATION REQUESTS IN DATA-INTENSIVE APPLICATIONS

(71) Applicant: DATAWARE VENTURES, LLC, Tucson, AZ (US)

(72) Inventors: Rui Zhang, Redondo Beach, CA (US); Richard T. Snodgrass, Tucson, AZ (US); Christian Convey, Wakefield, RI (US)

(73) Assignee: DATAWARE VENTURES, LLC, Tucson, AZ (US)

(*) Notice: Subject to any disclaimer, the term of this patent is extended or adjusted under 35 U.S.C. 154(b) by 771 days.

(21) Appl. No.: 16/620,769

(22) PCT Filed: Jun. 22, 2018

(86) PCT No.: PCT/US2018/039121
§ 371 (c)(1),
(2) Date: Dec. 9, 2019

(87) PCT Pub. No.: WO2018/237342
PCT Pub. Date: Dec. 27, 2018

(65) Prior Publication Data
US 2021/0279105 A1 Sep. 9, 2021

Related U.S. Application Data

(60) Provisional application No. 62/523,347, filed on Jun. 22, 2017.

(51) Int. Cl.
*G06F 9/54* (2006.01)
*G06F 3/06* (2006.01)
*G06F 9/50* (2006.01)

(52) U.S. Cl.
CPC .......... *G06F 9/5016* (2013.01); *G06F 3/0611* (2013.01); *G06F 3/0631* (2013.01);
(Continued)

(58) Field of Classification Search
CPC ...... G06F 9/5016; G06F 9/544; G06F 3/0611; G06F 3/0631; G06F 3/0644; G06F 3/0673
See application file for complete search history.

(56) References Cited

U.S. PATENT DOCUMENTS

| 5,202,995 A | 4/1993 | O'Brien | 395/700 |
| 5,493,675 A | 2/1996 | Faiman | 717/144 |

(Continued)

FOREIGN PATENT DOCUMENTS

| JP | S62274433 | 11/1987 | G06F 17/30 |
| JP | 06-180717 | 6/1994 | G06F 12/00 |

(Continued)

OTHER PUBLICATIONS

European Official Action issued in application No. 16876594.9, dated Oct. 24, 2019 (19 pgs).

(Continued)

*Primary Examiner* — Jacob Petranek
(74) *Attorney, Agent, or Firm* — HAYES SOLOWAY P.C.

(57) ABSTRACT

A computer-implemented method and related systems for reducing memory access stalls and memory allocation requests in data-intensive applications are provided. Invariants associated with execution paths that access data in a memory of the data-intensive application are identified. At least one field specialization technique using at least one speccode segment is then applied. The speccode segment exploits the identified invariants, thereby reducing at least one of memory stalls and memory allocation requests in a data-intensive application. The field specialization technique (Continued)

may include specialized software prefetching, a data distribution-based hash function, process to CPU binding, memory segment reuse, or memory layout optimization, or any combination thereof.

18 Claims, 7 Drawing Sheets

(52) U.S. Cl.
CPC .......... *G06F 3/0644* (2013.01); *G06F 3/0673* (2013.01); *G06F 9/544* (2013.01)

(56) References Cited

U.S. PATENT DOCUMENTS

| | | | |
|---|---|---|---|
| 5,787,418 A | 7/1998 | Hibbetts | |
| 5,842,022 A | 11/1998 | Nakahira et al. | ............. 395/709 |
| 5,842,209 A | 11/1998 | Mocek | |
| 5,999,924 A | 12/1999 | Bair et al. | .......... 707/4 |
| 6,029,002 A | 2/2000 | Afifi | ......... G06F 8/433 |
| 6,085,035 A | 7/2000 | Ungar | ............ 395/705 |
| 6,427,234 B1 | 7/2002 | Chambers et al. | .......... 717/140 |
| 6,487,713 B1 | 11/2002 | Cohen | ........ G06F 8/34 |
| 6,560,693 B1 | 5/2003 | Puzak et al. | ................... 712/207 |
| 6,622,300 B1 | 9/2003 | Krishnaswamy et al. | .... 717/130 |
| 6,634,022 B1 | 10/2003 | Leermakers | ............ G06F 8/443 |
| 6,925,630 B1 | 8/2005 | Britton | ........ G06F 8/51 |
| 6,961,930 B1 | 11/2005 | Waldspurger | ....... G06F 11/3419 |
| 7,039,909 B2 | 5/2006 | Wu et al. | ....................... 717/156 |
| 7,131,119 B2 | 10/2006 | Kumar | ........... 717/150 |
| 7,146,352 B2 | 12/2006 | Brundage et al. | ................ 707/2 |
| 7,254,810 B2 | 8/2007 | Barsness et al. | ............. 717/160 |
| 7,373,641 B2 | 5/2008 | Ogasawara | ................... 717/151 |
| 7,730,468 B1 | 6/2010 | Trowbridge | ........ G06F 9/44547 |
| 8,032,509 B2 | 10/2011 | Piedmonte | .................... 707/708 |
| 8,640,107 B2 | 1/2014 | Jaeger | ........... 717/126 |
| 9,122,523 B2 | 9/2015 | Pienaar | |
| 10,346,057 B1* | 7/2019 | Martin | .................. G06F 3/0683 |
| 2001/0042240 A1 | 11/2001 | Ng | ........... G06F 8/427 |
| 2002/0147969 A1 | 10/2002 | Lethin et al. | ................. 717/138 |
| 2003/0065688 A1 | 4/2003 | Dageville | ............ G06F 16/217 |
| 2003/0126151 A1 | 7/2003 | Jung | |
| 2003/0145314 A1 | 7/2003 | Nguyen et al. | ............... 717/158 |
| 2003/0200537 A1 | 10/2003 | Barsness | ........ 717/151 |
| 2004/0117359 A1 | 6/2004 | Snodgrass et al. | ................ 707/3 |
| 2004/0133747 A1 | 7/2004 | Coldewey | ..................... 711/137 |
| 2004/0243555 A1 | 12/2004 | Bolsius et al. | ..................... 707/3 |
| 2005/0050533 A1 | 3/2005 | Koseki | ................... G06F 8/441 |
| 2005/0188364 A1 | 8/2005 | Cockx | ..................... G06F 8/456 |
| 2005/0192951 A1 | 9/2005 | Day et al. | ......................... 707/3 |
| 2006/0026116 A1 | 2/2006 | Day et al. | .......................... 707/1 |
| 2006/0036398 A1 | 2/2006 | Funge | ..................... G06N 5/02 |
| 2007/0143357 A1 | 6/2007 | Chaudhri | .......... G06F 17/30017 |
| 2007/0226698 A1 | 9/2007 | Cascaval et al. | ............. 717/127 |
| 2007/0239656 A1 | 10/2007 | Santosuosso | ...................... 707/2 |
| 2007/0240135 A1 | 10/2007 | Stoodley et al. | ............. 717/140 |
| 2008/0052697 A1 | 2/2008 | Stoodley | ............... G06F 9/3851 |
| 2008/0189277 A1 | 8/2008 | Meijer | |
| 2009/0138574 A1* | 5/2009 | Hui | ..................... G06F 21/6218 709/219 |
| 2009/0248725 A1 | 10/2009 | Bhattacharjee et al. | ....... 707/101 |
| 2009/0288064 A1 | 11/2009 | Yen | ........................ G06N 5/02 |
| 2009/0307430 A1 | 12/2009 | Bruening et al. | ............. 711/119 |
| 2010/0231224 A1 | 9/2010 | Lindqvist | ...................... 324/365 |
| 2011/0072419 A1 | 3/2011 | Archambault | ............ G06F 8/43 |
| 2012/0079464 A1 | 3/2012 | De Smet | .......... G06F 17/30427 |
| 2012/0317647 A1 | 12/2012 | Brumley et al. | |
| 2013/0054649 A1 | 2/2013 | Potapov | ........................ 707/792 |
| 2013/0253936 A1 | 9/2013 | Harvey | .................. G04G 13/00 |
| 2013/0298130 A1 | 11/2013 | Pienaar | ........................ 718/102 |
| 2014/0115001 A1 | 4/2014 | Arroyo | ........................ 707/772 |
| 2014/0157260 A1 | 6/2014 | Balani | ................ G06F 9/45533 |
| 2014/0189667 A1 | 7/2014 | Kanhere | ........................ 717/160 |
| 2014/0365533 A1* | 12/2014 | Debray | ............ G06F 16/2228 707/803 |
| 2015/0134637 A1 | 5/2015 | Pall | ............................... 707/718 |
| 2015/0363294 A1 | 12/2015 | Carback, III | ........ G06F 11/3672 |
| 2016/0092365 A1 | 3/2016 | Shivarudraiah | ........ G06F 16/172 |
| 2016/0110172 A1* | 4/2016 | Snodgrass | ................. G06F 8/36 717/166 |
| 2016/0170727 A1 | 6/2016 | Mars | ...................... G06F 9/4552 |
| 2016/0283229 A1* | 9/2016 | Rogers | .................... G06F 8/751 |

FOREIGN PATENT DOCUMENTS

| | | | | |
|---|---|---|---|---|
| JP | H07234793 | 9/1995 | ............... | G06F 9/38 |
| JP | 9-91148 | 4/1997 | ............... | G06F 9/45 |
| JP | H10320211 | 12/1998 | ............... | G06F 9/45 |
| JP | 2000187596 | 7/2000 | ............... | G06F 9/45 |
| JP | 2000-315160 | 11/2000 | ............... | G06F 9/45 |
| JP | 2002-073387 | 12/2002 | ............. | G06F 12/00 |
| JP | 2003-196106 | 7/2003 | ............. | G06F 8/433 |
| JP | 2003-202994 | 7/2003 | ............... | G06F 9/45 |
| JP | 2004145589 | 5/2004 | ............... | G06F 9/45 |
| JP | 2005-18767 | 1/2005 | ............. | G06F 17/30 |
| JP | 2011-161502 | 8/2011 | ............. | B23K 11/14 |
| WO | WO2013096894 | 6/2013 | ............. | G06F 17/30 |
| WO | WO2016161130 | 10/2016 | ............... | G06F 9/45 |

OTHER PUBLICATIONS

Indian Official Action issued in application No. 5723/DELNP/2014, dated Jan. 14, 2020 (8 pgs).
International Preliminary Report on Patentability issued in application No. PCT/US2018/039121, dated Jan. 2, 2020 (6 pgs).
Beckmann et al., "ASR: Adaptive Selective Replication for CMP Caches," The 39th Annual IEEE/ACM International Symposium on Microarchitecture (MICRO'06) published on 2006 (12 pgs).
Bonwick et al., "The Slab Allocator: An Object-Caching Kernel Memory Allocator," Proceedings Usenix Technical Conference, pp. 87-98, Jun. 1994 (18 pgs).
Calder et al., "Value Profiling and Optimization," Journal of Instruction-Level Parallelism, vol. 1, Mar. 1999 (37 pgs).
Canadian Official Action issued in related Canadian Patent Application Serial No. 2,860,223, dated Jan. 25, 2017 (4 pgs).
Consel et al., "A General Approach for Run-Time Specialization and its Application to C," Institut de Recherche en Informatique et Systémes Aléatoires, Jul. 1995 (24 pgs).
Consel et al., "A tour of Tempo: a program specializer for the C language," Science of Computer Programming, vol. 52, No. 1-3, Aug. 2004 (30 pgs).
Eckstein, R., "Java SE Application Design With MVC," Oracle Technology Network, Mar. 2007 (8 pgs).
Elmasri et al., "Fundamentals of Database Systems," Addison Wesley Publishing Company, 6th Edition, Apr. 2010, book summary only (2 pgs).
European Office Action issued in application 16876594.9-1224, dated Jun. 27, 2019 (22 pgs).
European Office Action issued in application No. 12 858 918.1, dated Jul. 31, 2018 (6 pgs).
European Search Report issued in application No. 16774209.7, dated Jul. 26, 2018 (12 pgs).
European Search Report issued in application No. 16876594.9, dated Oct. 7, 2019 (18 pgs).
Free Software Foundation, Inc., "Optimize Options—Using the GNU Compiler Collection (GCC), Options That Control Optimization," downloaded from https://gcc.gnu.org/onlinedocs/gcc/Optimize-Options.html on Feb. 11, 2015 (52 pgs).
Graefe et al., "The Volcano optimizer generator; extensibility and efficient search," Proceedings of the International Conference on Data Engineering. Vienna, Apr. 19-23, 1993 (10 pgs).
Grant et al., "DyC: an expressive annotation-directed dynamic compiler for C," Theoretical Computer Science, Amsetrdam, NL, vol. 248, No. 1/02, Oct. 6, 2000, pp. 147-199 (53 pgs).
Guravannavar, R., "Rewriting Procedures for Batched Bindings," Proceedings of the VLDB Endowment, Aug. 2008, pp. 1107-1123 (17 pgs).
International Preliminary Report on Patentability issued in application No. PCT/US2016/025295, dated Oct. 12, 2017 (9 pgs).

(56) References Cited

OTHER PUBLICATIONS

International Preliminary Report on Patentability issued in application PCT/US2016/066665, dated Jun. 19, 2018 (10 pgs).
International Preliminary Report on Patentability issued in corresponding application No. PCT/US2012/071468, dated Jun. 24, 2014 (6 pgs).
International Search Report and Written Opinion issued in application No. PCT/US2016/025295, dated Jul. 29, 2016 (11 pgs).
International Search Report and Written Opinion issued in application No. PCT/US2016/066665, dated Apr. 27, 2017 (14 pgs).
International Search Report and Written Opinion issued in application No. PCT/US18/39121, dated Sep. 14, 2018 (8 pgs).
International Search Report issued in corresponding application No. PCT/US2012/071468, dated Apr. 19, 2013 (3 pgs).
Japanese Decision of Refusal (w/translation) issued in application No. 2018-502613, dated Apr. 3, 2019 (6 pgs).
Japanese Decision to Grant (w/machine translation) issued in application No. 2014-548980, dated Sep. 26, 2017 (5 pgs).
Japanese Decision to Grant (w/translation) issued in application No. 2017-206276, dated Feb. 6, 2019 (6 pgs).
Japanese Office Action (w/machine translation) issued in application No. 2014-548980, dated Aug. 3, 2017 (6 pgs).
Japanese Office Action (w/translation) issued in application No. 2017-206276 (6 pgs).
Japanese Office Action (w/translation) issued in application No. 2017-206276, dated Dec. 13, 2018 (4 pgs).
Japanese Office Action (w/translation) issued in application No. 2018-502613, dated Dec. 4, 2018 (13 pgs).
Krikellas et al., "Generating code for holistic query evaluation," Proceedings of the IEEE International Conference on Data Engineering (ICDE), 2010, pp. 613-614 (13 pgs).
Linux Foundation, "Executable and Linking Format (ELF) Specification," TIS Committee, May 1995 (106 pgs).
Linux Foundation, "System V Application Binary Interface," Edition 4.1, Mar. 1997 (271 pgs).
Lussier, D., BenchmarkSQL project description and information, downloaded from http://pgfoundry.org/projects/benchmarksql/ on Feb. 11, 2015 (2 pgs).
Muth et al., "Code Specialization based on Value Profiles," Proceedings International Static Analysis Symposium (SAS), Jun. 2000 pp. 340-350 (20 pgs).
Notice of Allowance issued in U.S. Appl. No. 14/368,265, dated Dec. 20, 2016 (22 pgs).
Notice of Allowance issued in U.S. Appl. No. 14/968,296, dated Mar. 13, 2019 (26 pgs).
Notification for Reasons for Refusal issued in corresponding Japanese Appln. Serial No. 2014-548980, dated Sep. 30, 2016, with English translation (26 pgs).
Office Action issued in U.S. Appl. No. 14/368,265, dated May 31, 2016 (25 pgs).
Office Action issued in U.S. Appl. No. 14/968,296, dated Apr. 5, 2018 (20 pgs).
Office Action issued in U.S. Appl. No. 14/968,296, dated Oct. 26, 2018 (35 pgs).
Office Action issued in U.S. Appl. No. 14/968,827, dated Dec. 20, 2018 (40 pgs).
Office Action issued in U.S. Appl. No. 14/968,827, dated Jun. 17, 2019 (46 pgs).
Office Action issued in U.S. Appl. No. 14/968,827, dated Jun. 30, 2017 (49 pgs).
Office Action issued in U.S. Appl. No. 14/968,827, dated May 17, 2018 (52 pgs).
Office Action issued in U.S. Appl. No. 16/062,592, dated Nov. 18, 2019 (61 pgs).
Official Action issued in corresponding U.S. Appl. No. 14/968,827 dated Jan. 10, 2018, 47 pgs.
PCT Notice—Invitation to Pay Additional Fees issued in related PCT International Patent Application Serial No. PCT/US2016/066665, Dated Jan. 30, 2017 (2 pgs).
PostgreSQL Global Development Group, "18.4 Resource Consumption," PostgreSQL 8.4.22 Documentation, downloaded from http://www.postgresql.org/docs/8.4/static/index.html on Feb. 11, 2015 (9 pgs).
Speight et al., "Adaptive Mechanisms and Policies for Managing Cache Hierarchies in Chip Multiprocessors," ACM published on 2005 (11 pgs).
Supplemental European Search Report issued in application No. 12858918.1, dated Oct. 27, 2015 (9 pgs).
Transaction Processing Performance Council, "TPC Benchmark™-C," Revision 5.11, Feb. 2010 (132 pgs).
Transaction Processing Performance Council, "TPC Benchmark™-H," Revision 2.1.0 (150 pgs).
Valgrind Developers, "Callgrind: a call-graph generating cache and branch prediction profiler," Valgrind User Manual, Release 3.10.0, Sep. 10, 2014 (19 pgs).
Wei et al., "Practical Blended Taint Analysis for JavaScript," Copyright 2013 ACM (11 pgs).
U.S. Appl. No. 14/368,265, filed Jun. 23, 2014.
U.S. Appl. No. 14/968,296, filed Dec. 14, 2015.
U.S. Appl. No. 14/968,827, filed Dec. 14, 2015.
U.S. Appl. No. 16/062,592, filed Jun. 14, 2018.
U.S. Appl. No. 16/062,592, filed Jun. 14, 2018, Snodgrass et al.

* cited by examiner

FIELD SPECIALIZATION TO REDUCE MEMORY-ACCESS STALLS AND ALLOCATION REQUESTS IN DATA-INTENSIVE APPLICATIONS

The present disclosure is generally related to field specialization to reduce memory-access stalls and memory allocation requests in database management systems and data-intensive applications.

A database management system (DBMS) is a collection of software programs that manage the storage and access of data. As the capacity of main memory increases and as its cost reduces, more memory is configured for use by DBMS servers and other data-intensive applications. The benefit of utilizing more memory is that larger volumes of data can be stored in the main memory, thereby significantly improving the efficiency of these applications. This is due to the fact that most or all of the data needed to evaluate a query or perform the requested analysis can be fetched directly from the main memory without having to access the hard disks, which are orders of magnitude slower in data access bandwidth.

However, even with this improvement, main-memory access continues to present a bottleneck in query evaluation in DBMSs and in data-intensive applications. Even though main memory is faster in data-access speed compared to disk access, main memory speed is still substantially slower than the rate at which instructions are being executed by the central processing unit (CPU). In particular, within these code paths, a large portion of the executed instructions performs data reads and writes. When data is read from or written into the main memory, the execution of these memory-related instructions will stall, waiting for the main memory to complete the requests.

Thus, a heretofore unaddressed need exists in the industry to address the aforementioned deficiencies and inadequacies.

Embodiments of the present disclosure provide systems and methods for reducing memory access stalls and memory allocation requests in data-intensive applications, such as in a database management system. In this regard, one embodiment of such a method, among others, can be broadly summarized by the following steps: Invariants associated with execution paths that access data in a memory of the data-intensive application are identified. At least one field specialization technique generating at least one specialized code (termed, "speccode") segment is then applied. The speccode segment exploits the identified invariants, thereby reducing memory stalls and/or memory allocation requests in data-intensive application. The field specialization technique may include specialized software prefetching, a data distribution-based hash function, process to CPU binding, memory segment reuse, or memory layout optimization, or any combination thereof.

In one embodiment the data-intensive application further comprises a database management system.

In one embodiment where the at least one field specialization technique comprises software prefetching, at least one of: a control-flow invariant; and a number of cycles invariant are identified, preferably by inserting software prefetching instructions into the at least one speccode segment, optionally by using at least one data prefetching hint to determine a prefetching level.

In another embodiment the at least one field specialization technique comprises a data distribution-based hash function, and preferably, further comprises transforming an input value used as a key by a hash table with at least one of: a complete value distribution hash function and a refined value distribution hash function, wherein the complete value distribution hash function preferably relies on a value distribution of all rows of a column of an underlying table upon which the hash table is built, and the refined value distribution hash function relies on a value distribution of a subset of all rows of the column of the underlying table upon which the hash table is built.

In another embodiment, the at least one field specialization technique comprises a CPU binding of processes, wherein the CPU binding of processes preferably is dependent on:
a presence of inter-process data transfer; and
a size of the data transfer being substantial.

In yet another embodiment the at least one field specialization technique comprises a memory segment reuse processes, wherein the memory segment reuse processes preferably comprises:
use memory access analysis, including both static pointer alias analysis and dynamic profiling to track all the reads and writes to a memory segment;
determine if there is a portion of a lifetime of the memory segment where it is not used;
determine whether two memory allocations of the memory segment are adjacent during execution thereof;
determine a size of the memory segment; and
apply field specialization to reuse the memory segment.

In yet another embodiment the at least one field specialization technique comprises memory layout optimization, wherein memory layout optimization preferably comprises:
acquiring memory segments from specific locations within the memory with a specialized allocator to produce allocated memory segments;
determining access patterns of data stored within the allocated memory segments; and
optimizing a layout of data stored within the allocated memory segments with the locations determined by the access patterns.

Other systems, methods, features, and advantages of the present disclosure will be or will become apparent to one with skill in the art upon examination of the following drawings and detailed description. It is intended that all such additional systems, methods, features, and advantages be included within this description, be within the scope of the present disclosure, and be protected by the accompanying claims.

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

Many embodiments of the disclosure may take the form of computer-executable instructions, including algorithms executed by a programmable computer. However, the disclosure can be practiced with other computer system configurations as well. Certain aspects of the disclosure can be embodied in a special-purpose computer or data processor that is specifically programmed, configured or constructed to perform one or more of the computer-executable algorithms described below.

The disclosure also can be practiced in distributed computing environments, where tasks or modules are performed by remote processing devices that are linked through a communications network. Moreover, the disclosure can be practiced in Internet-based or cloud computing environments, where shared resources, software and information may be provided to computers and other devices on demand. In a distributed computing environment, program modules, or subroutines, may be located in both local and remote memory storage devices. Aspects of the disclosure described below may be stored or distributed on computer-readable media, including magnetic and optically readable and removable computer disks, fixed magnetic disks, floppy disk drive, optical disk drive, magneto-optical disk drive, magnetic tape, hard-disk drive (HDD), solid state drive (SSD), compact flash or non-volatile memory, as well as distributed electronically over networks, including the cloud. Data structures and transmissions of data particular to aspects of the disclosure are also encompassed within the scope of the disclosure.

Moreover, while field specialization is disclosed herein primarily with respect to a DBMS, it should be understood that the concepts provided herein may be applied to any program that manipulates data and in particular, performs complex analysis on that data.

To overcome the aforementioned problems within the industry, in particular, to alleviate the stalling of the execution of memory-related instructions, the present disclosure provides various field specialization techniques to improve the efficiency of in-memory processing by DBMSs and other data-intensive applications. These specialization techniques employ speccode which may be created by one or more specializers ("spiffs") in the field which is inserted into DBMS code. The speccode may be both smaller and faster than the original unspecialized code. The speccode may be tailored to the runtime values of invariants associated with execution paths that access data in the memory in order to minimize stalls during instruction executions due to these memory accesses. These techniques may enable the CPU caches to fulfill as many data read and write requests as possible, thereby minimizing main-memory access.

Figure 1:
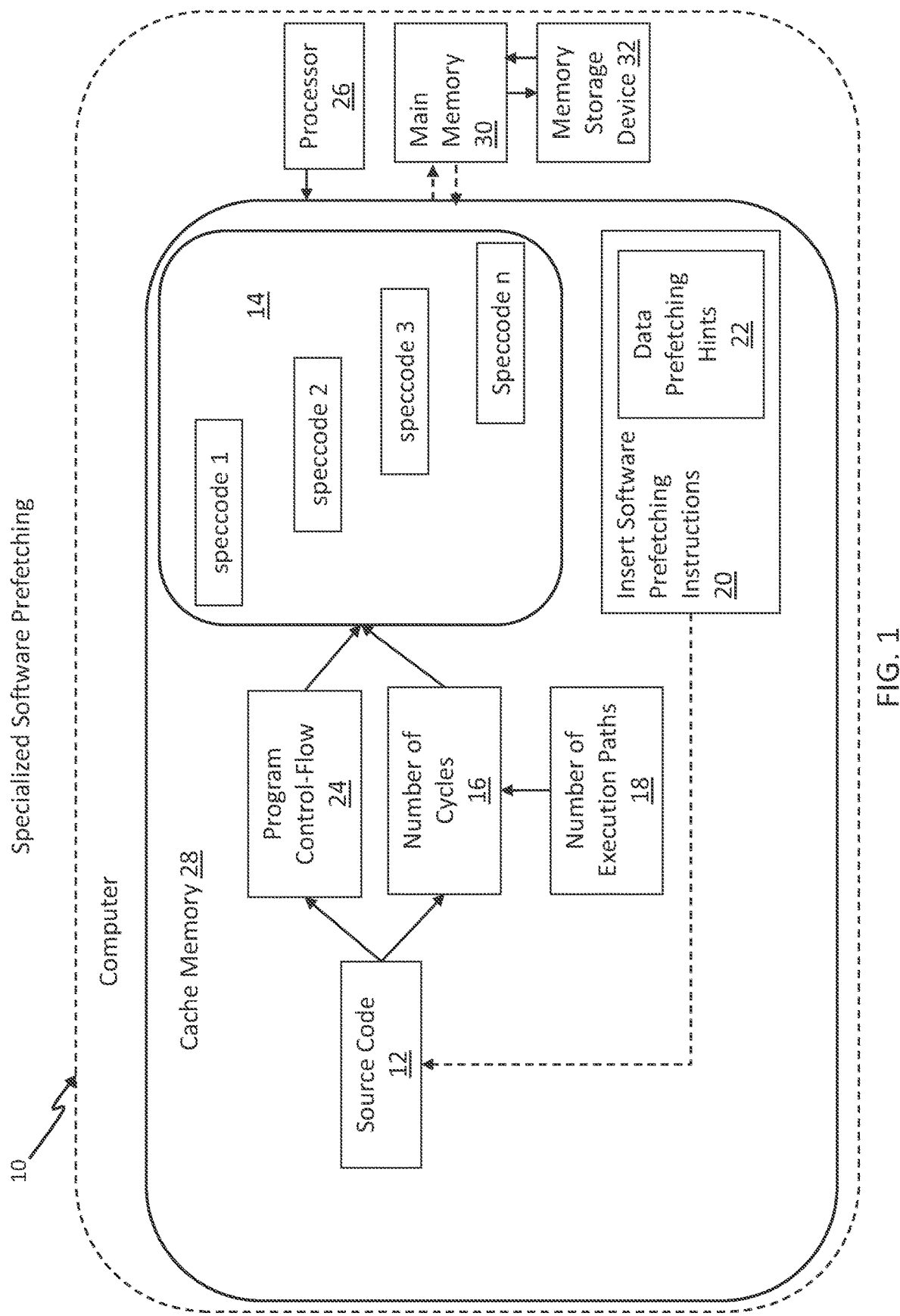
FIG. 1 is a diagrammatical illustration of specialized software prefetching, in accordance with a first exemplary embodiment of the present disclosure.

FIG. 1 is a diagrammatical illustration of a specialized software prefetching 10, in accordance with a first exemplary embodiment of the present disclosure. Specialized software prefetching is one technique which may be employed for reducing memory-access stalls and memory allocations.

Modern CPUs are able to perform hardware prefetching when data is accessed in a predictable pattern. A typical example of such a pattern may be a tight loop iterating through a large array. When the data access pattern of the program is more complicated than such a simple loop, hardware prefetching may not be as effective. Accordingly, in such cases, inserting software-prefetching instructions 20 into the source code 12 of the program can be an effective way to mask the memory-access overhead by having the processor 26 carry out computations at the same time that do not depend on the data that is being fetched from the main memory 30 or memory storage device 32.

Adding software prefetching instructions 20 requires that the data access pattern of the program, or the execution path, also be predictable. By knowing how many cycles 16 the computation takes before the memory value is needed, the prefetching instruction can be added and configured with an effective prefetching distance. Knowing the cycles that will be taken by a code segment may be challenging, particularly because a code segment may consist of many possible execution paths 18, sometimes also involving calls to other routines that have their own execution paths. Each of these execution paths may present a different number of cycles that will execute at runtime.

Field specialization can transform segments of source code 12 into multiple speccodes 14, each corresponding to particular execution path(s) contingent upon information known only at runtime. In this way, the number of cycles 16 taken by each speccode during execution can be more straightforward to determine, enabling prefetching instructions to be added to each of the speccodes 14, such that each newly-added prefetching instruction is configured with a specific prefetching distance.

Additionally, there are multiple data prefetching hints 22 that can be specified for data prefetching, including: load to level-1 cache, load to level-2 cache, load to level-3 cache, and to not load into the cache memory 28. Depending on the specifics of a memory access pattern, the added prefetching instructions can thus be configured with such hints directing the appropriate prefetching level.

While applying field specialization, two types of invariants may first be identified. To transform the original code segment into speccodes, the variables and/or expressions that determine the control-flow 24 of the program, for example, such as in an if statement, should be identified. When the values of these variables are in fact runtime-invariant (a control-flow invariant), the associated conditional evaluations logic can then be eliminated from the speccodes and each speccode will represent the individual execution path(s) that originally corresponded to distinct branches under the conditional evaluation logic. A second type of invariant, the number of cycles invariant, is the length of each resulting speccode, in terms of instruction execution cycles 16. This length can be used to compute the prefetching distance for each memory access within each individual speccode.

Another technique which may be employed for reducing memory-access stalls and memory allocations includes a data distribution-based hash function, which can eliminate memory stalls originating from hash table lookup operations. Hash tables are often utilized by data-intensive applications, including DBMSs. Examples are hash joins and hash-based aggregate operations performed during query evaluation in a DBMS. A typical hash table consists of many hash buckets, each containing a collection of entries. In one example, one implementation, namely separate chaining, represents such a collection using a linked list of entries. During the building of a hash table, an input value is transformed, using a hash function, into a hash value. This hash value is then used to identify a particular bucket in the hash table. When multiple entries are present in the set associated with the current bucket, and when the hash table is probed, such as when performing a hash join, the relevant set is scanned to identify matching rows. Given that the entries in the set can be stored in arbitrary locations, accessing these entries can lead to substantial memory stalls due to data-cache misses.

As an example, for a given hash join during query evaluation, the corresponding hash table is often built based on particular columns from the tables that are being joined. The data type of the column, width of the column, and the value range of this column can all be determined and remain invariant during evaluation of that query. This metadata is usually stored in the system catalog, which is consulted during query optimization.

Figure 2:
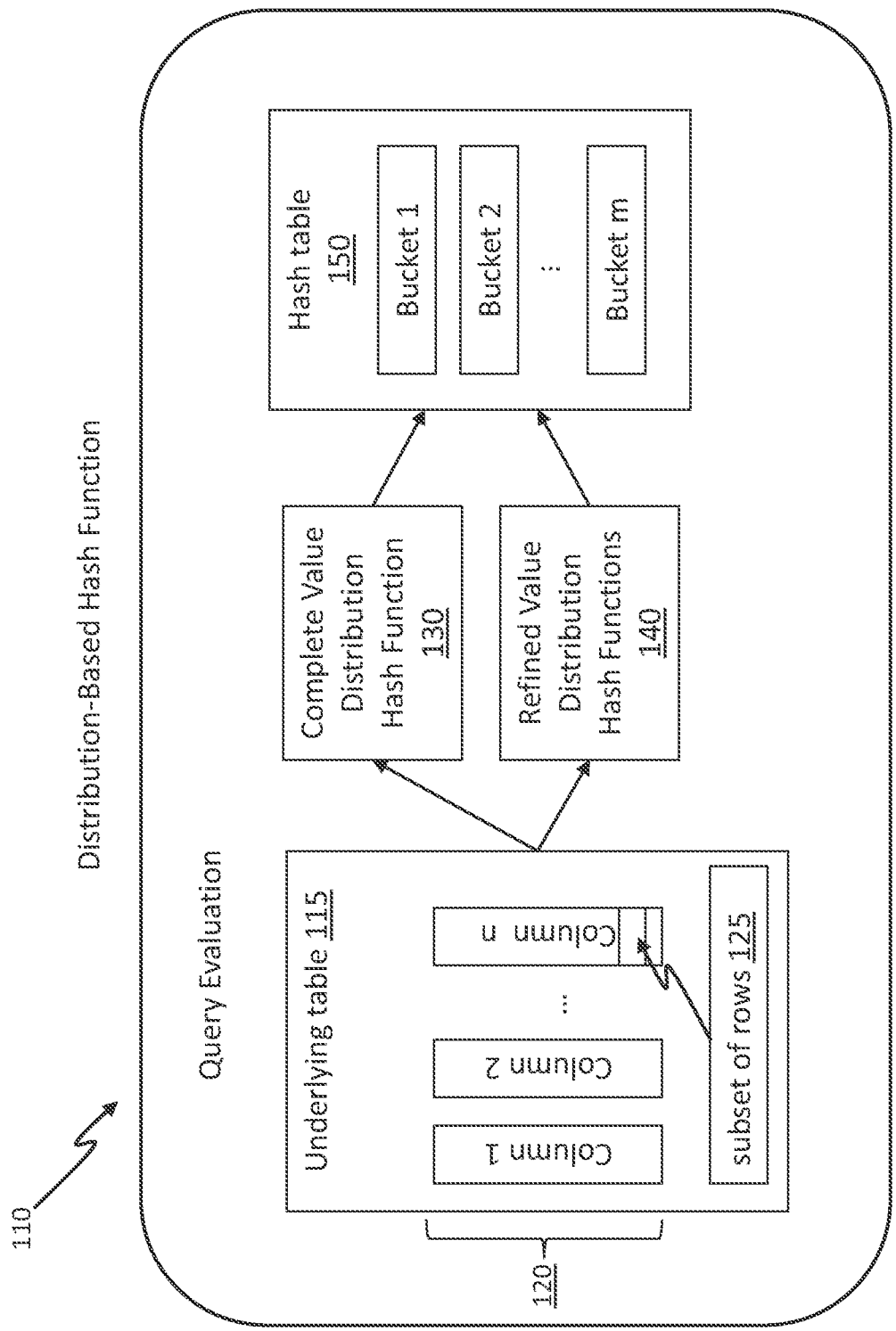
FIG. 2 is a diagrammatical illustration of a distribution-based hash function, in accordance with a second exemplary embodiment of the present disclosure.

FIG. 2 is a diagrammatical illustration of a distribution-based hash function 110, in accordance with a second exemplary embodiment of the present disclosure. Field specialization can be applied to specialize the hash function(s) invoked, such as during evaluation of a particular query, by exploiting the values of invariants, as mentioned above, that are associated with the particular join columns 120 used as the key of the hash table. As an example, when the range of the values stored within a column 120 of the hash table is known to be between two hundred (200) and three hundred (300), a perfect hash function can be employed to map all one hundred (100) possible values into a hash table 150 of one hundred (100) buckets. Such a hash function specialized on the complete value distribution 130, where the value distribution of all rows for a given column 120 in the underlying table 115, upon which the hash table is built is considered, may guarantee that there will be no collisions, because each set has exactly one entry. Thus, probing this hash table will be very efficient, as the need for (and thus the overhead associated with) the traversal of the sets has been eliminated.

Moreover, there is an additional benefit, which is that using a specialized perfect hash function 130 can reduce cache pressure. This is because a generic hash function will likely convert consecutive values in a domain into a set of unordered values. As a result, the hash table buckets associated with these consecutive values will be necessarily stored in non-sequential locations within the memory. However, during probing, when the values from the probe side are ordered, or at least partially ordered, accessing the hash table via the identity hash function will significantly reduce memory stalls, especially if the hash table is too large to fit in the CPU caches, because an identity hash function guarantees the absence of duplicate hits from different probe values when these values are (even just partially) sorted.

It is noted that the discussion relative to the specialized complete value distribution hash function 130 assumes that hash table is built on all the rows present in the join column in an underlying table. In a query, some hash join operations may only take place after other plan operations. For instance, a hash join may be joining the rows that result from table scan(s) with filters, effecting predicates within the query. When the predicates are of high selectivity, in other words, if only a relatively small number of rows are emitted by the table scan, using a hash function within the join that is specialized on the original value distribution may no longer be the best choice. Instead a refined hash function 140 tailored just to the distribution of the values based on which the hash table is created may be a better solution. The refined value distribution 140 may be based on certain intermediate values produced by particular query plan operators, such as the value distribution of a subset of rows 125 from a particular column produced by a filtering operation issue by the query. The refined value distribution 140 can often be obtained from the query plan as an estimate. Field specialization can provide the capability and flexibility of letting specific hash table building routines be generated that exploit the relevant data distribution, known only at runtime.

Note that the above discussion focuses on an example of utilizing consecutive integers as hash values. Concerning hash function specializations, similar principles can apply to more sophisticated value transformations, depending on the requirements of the hash table. As a generalization, when the data type and range of the hash values—e.g., 32 bit integer, in range $[0, 2^{32})$—are known and the data type and range of the input value are known, one can devise a mapping between the two value domains effecting the value transformation.

A third way to reduce memory stalls is by carefully managing CPU binding of processes within a data-intensive application, using information available only at runtime.

In a multi-process software application that employs a consumer-producer execution model, data is transferred among multiple processes during the execution of such an application. In this scenario, a consumer process will be placed by the operating system (OS) scheduler within the operating system into the suspended state while waiting for a producer process to send data. When the consumer process is woken up, the scheduler will allocate a logical CPU to the consumer process to resume its execution. (in a multicore CPU equipped with hyper-threading, a logical CPU corresponds to a unique thread within a physical core on the CPU. For instance, on a quad-core CPU with hyper-threading, there are eight logical CPUs within this physical CPU.) The scheduler may select a different logical CPU on which the consumer will subsequently execute. Switching to a different logical CPU can lead to substantial loss of data locality, especially if the newly-selected logical CPU is located on a different physical processor core. This is because running processes (which can be other consumers or producers that are processing different sets of data) could be currently active on this selected logical CPU, and therefore by scheduling the consumer onto a different logical CPU, the content stored in the data caches on that CPU might be invalidated. As a result of this scheduling, that (now active) process will have to read data from main memory, thereby resulting in a memory stall. A subsequent context switch back to the original logical CPU will probably result in further memory stalls. When such a suspend-resume cycle occurs frequently during the application execution and when large amounts of data are being sent and received, switching logical CPUs can thus lead to significant performance degradation.

To address this shortcoming, identified pairs of consumer process and producer process should be bound to a particular logical CPU to maximize data locality. It is noted that the selection of the logical CPU by the OS scheduler can be determined by various factors, including the availability of the logical CPUs, at the point of the context swap. Therefore, in some cases, process-CPU binding may not be beneficial, as a logical CPU may be busy performing other tasks by other processes. As an example concerning query evaluation, it is often the case that for the same type of query-plan operator, such as hash join, that appears multiple times in the plan tree, only certain ones will involve inter-process data transfer.

Figure 3:
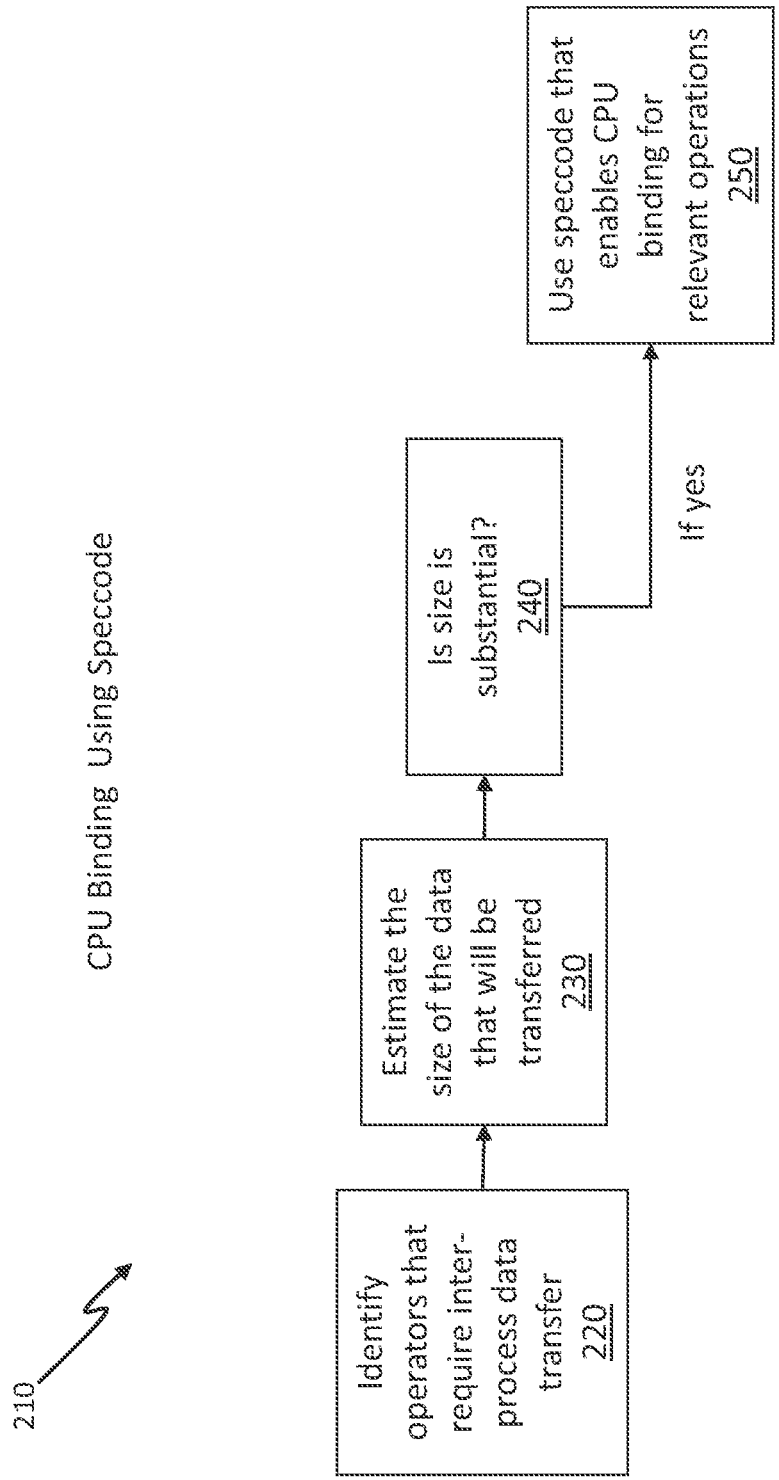
FIG. 3 is a diagrammatical illustration of a CPU binding process using speccode, in accordance with a third exemplary embodiment of the present disclosure.

FIG. 3 is a diagrammatical illustration of a CPU binding of processes using speccode 210, in accordance with a third exemplary embodiment of the present disclosure. With field specialization, a more effective process-CPU binding for this particular situation can be realized by adding the affinity-setting system call to the speccodes that specialize the stock routines in the consumers or the producers that perform data manipulation. For example, following query evaluation of FIG. 2, as shown in FIG. 3, it may be crucial to first identify the operators that require inter-process data transfer (block 220). Second, the size of the data that will be transferred can be estimated (block 230). If the size is substantial (block 240), then it may be beneficial for the speccode to perform that binding (block 250).

A fourth way to reduce memory stalls is by carefully managing memory allocation and reusing memory segments, when possible.

Memory allocation and deallocation in performance-critical execution paths can result in significant performance penalty for two reasons. First, memory allocation and deallocation are implemented with potentially complex logic. For example, a memory management component may organize memory segments using a linked list. A memory allocation with a certain size will require the traversal of this list until a memory segment that satisfies the requested size is reached. During deallocation, the freed segment will be added back onto the list. Additional manipulation may also be performed, such as merging small free segments to form larger segments. Second, a memory allocation can return a memory segment located at an arbitrary location in the memory. When such a memory segment is read or written, memory-access stalls can occur, as the content of that memory needs to be loaded into the CPU caches.

It has been observed that in some execution paths within data-intensive applications such as DBMSs, memory allocation is performed with a fixed size, or with a size that the majority of the allocations do not exceed. For such memory allocation requests, the same memory segment can sometimes be reused, rather than having to deallocate and allocate memory repeatedly.

Figure 4:
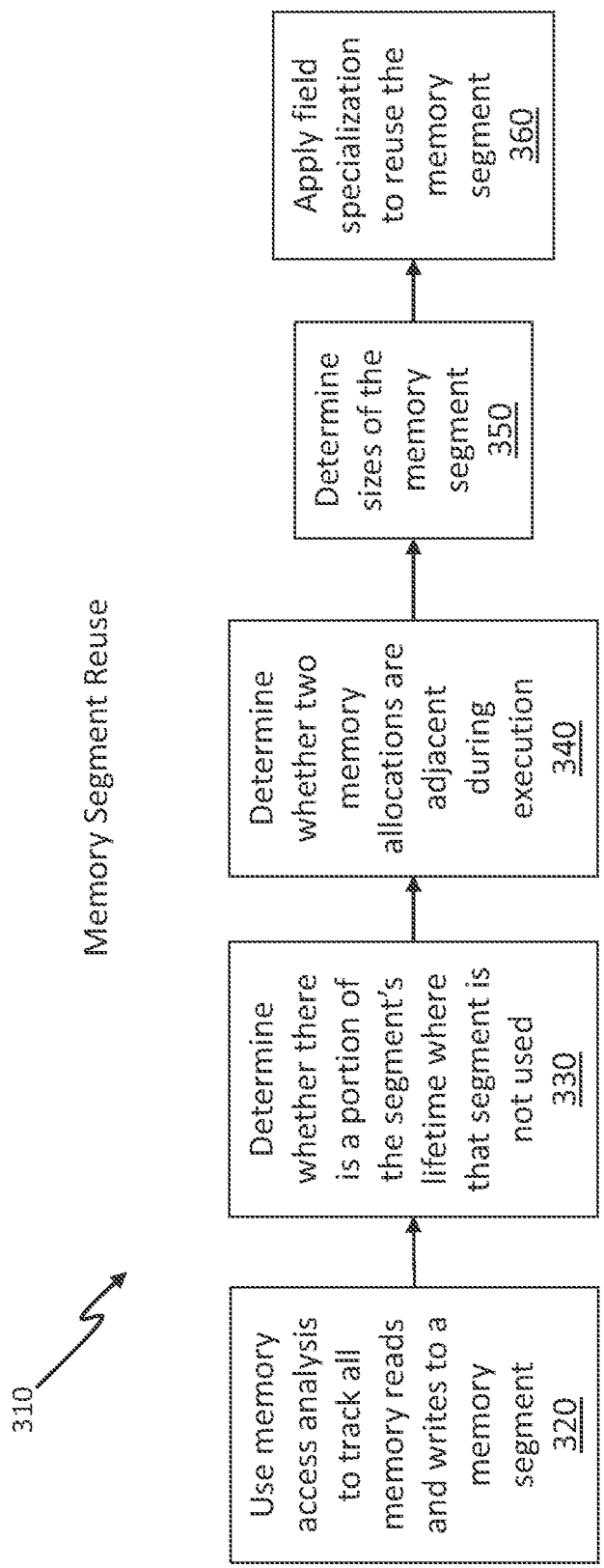
FIG. 4 is a diagrammatical illustration of a memory segment reuse process using field specialization, in accordance with a fourth exemplary embodiment of the present disclosure.

FIG. 4 is a diagrammatical illustration of a memory segment reuse process using field specialization 310, in accordance with a fourth exemplary embodiment of the present disclosure. In applying field specialization, a speccode can exploit the size of the memory allocation request and thus reuse the memory segment. To enable such a specialization, the analysis can (a) use memory access analysis, including both static pointer alias analysis and dynamic profiling, to track all the reads and writes to a memory segment (block 320), (b) determine whether there is a portion of the segment's lifetime where that segment is not used (block 330), and (c) determine whether the two allocations are adjacent during execution (block 340). It is noted that sometimes a value of a variable—the invariant—will partition the possible paths so that one or more of the paths allow this specialization. Then, the sizes of the segments need to be determined (block 350) and field specialization can be applied to reuse the memory segment (block 360).

As described, optimization may be used to eliminate unnecessary memory allocation and deallocation calls. The analysis for determining which allocation call(s) can be eliminated may be differentiated in three scenarios.

The first scenario is disjoint segments, each allocating and then deallocating a memory segment, which is illustrated in the following code snippet.

```
void foo(int a, int b) {
    int* A=malloc(sizeof(int));
    *A=a;
    printf("%d\n", *A);
    free(A);
    int* B=malloc(sizeof(int));
    *B=b;
    printf("%d\n", *B);
    free(B);
}
```

Figure 5:
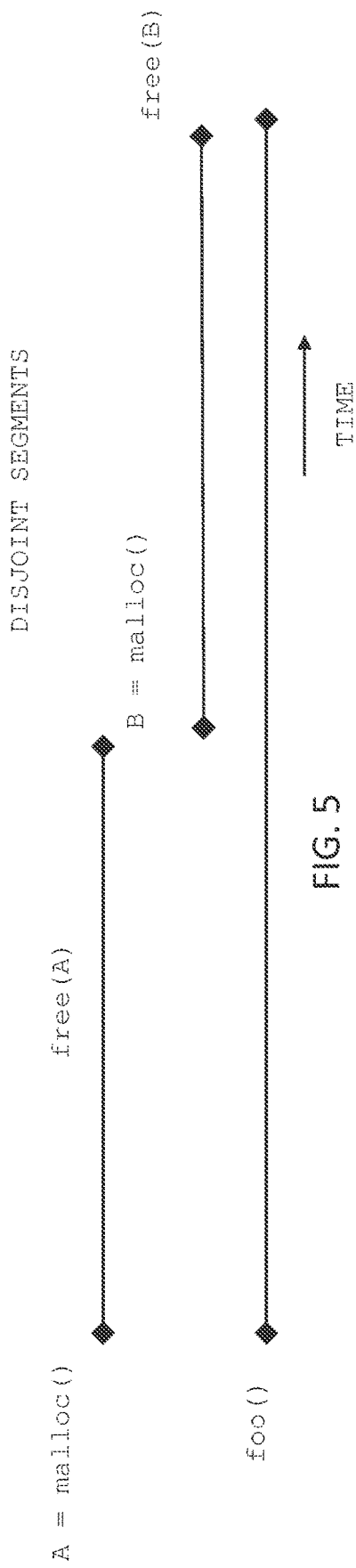
FIG. 5 is a corresponding visual illustration of code of a single function that allocates two memory segments that are accessed at disjointed periods of time, in accordance with the fourth exemplary embodiment of the present disclosure.

FIG. 5 is a corresponding visual illustration of code of a single function that allocates two memory segments that are accessed at disjointed periods of time, in accordance with the fourth exemplary embodiment of the present disclosure, where disjoint segments are accesses to memory allocated in the first malloc( ) which will not impact accesses to memory allocated in the second malloc( ), and vice versa.

The second scenario is overlapping segments, in which the first memory segment is deallocated only after the second memory segment is allocated, which is illustrated in the following code snippet.

```
void foo(int a, int b) {
    int* A=malloc(sizeof(int));
    *A=a;
    printf("%d\n", *A);
    int* B=malloc(sizeof(int));
    *B=b;
    free(A);
    printf("%d\n", *B);
    free(B);
}
```

Figure 6:
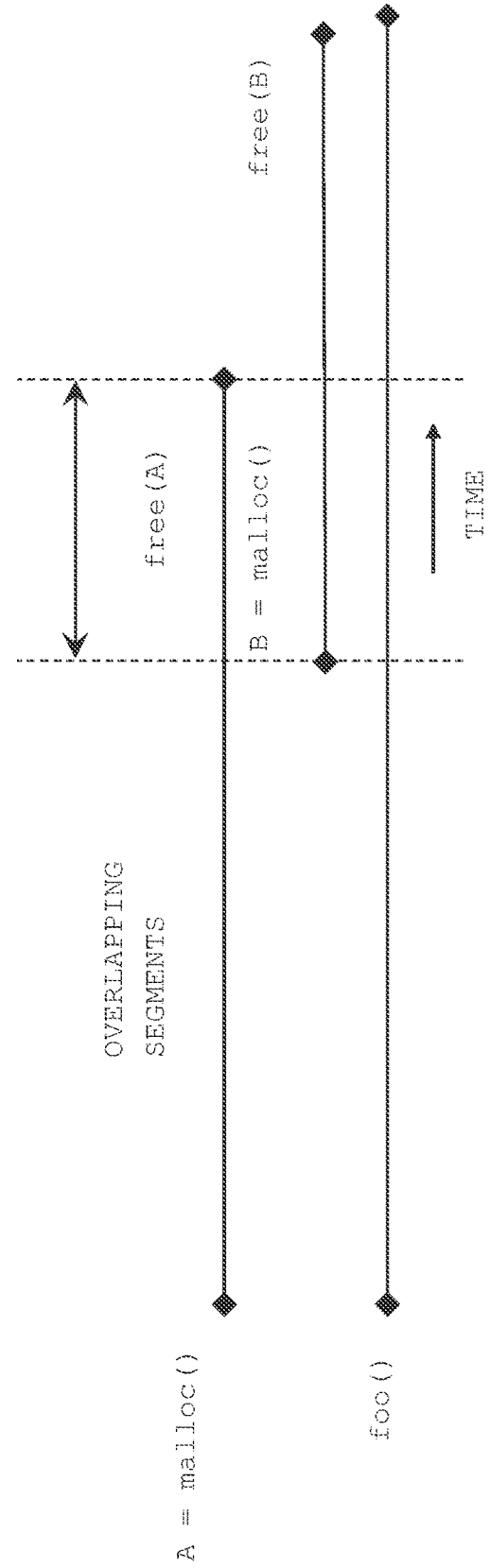
FIG. 6 is a corresponding visual illustration of the allocated memory segments of overlapping segments, in accordance with the fourth exemplary embodiment of the present disclosure.

FIG. 6 is a corresponding visual illustration of the allocated memory segments of overlapping segments in this scenario, in accordance with the fourth exemplary embodiment of the present disclosure, where overlapping segments are accesses to memory allocated in the first malloc( ) which could impact (cause to temporarily block) accesses to memory allocated in the second malloc( ), and vice versa.

The third scenario is containing segments, in which the second memory segment is allocated and deallocated before the first memory segment is deallocated, which is illustrated in the following code snippet.

```
void foo(int a, int b) {
    int* A=malloc(sizeof(int));
    *A=a;
    printf("%d\n", *A);
    int* B=malloc(sizeof(int));
    *B=b;
    printf("%d\n", *B);
    free(B);
    free(A);
}
```

Figure 7:
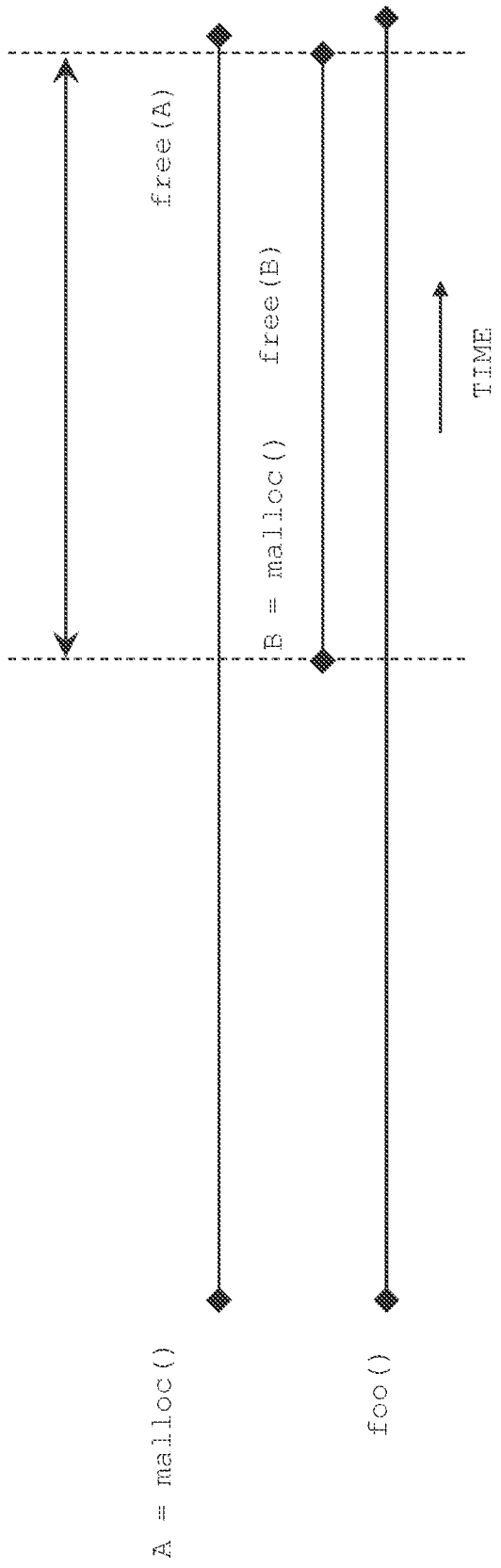
FIG. 7 is a corresponding visual illustration of the allocated memory segments of containing segments, in accordance with the fourth exemplary embodiment of the present disclosure.

FIG. 7 is a corresponding visual illustration of the allocated memory segments of containing segments in this scenario, in accordance with the fourth exemplary embodiment of the present disclosure, where containing segments are accesses to memory allocated in the contained malloc( ) which could impact (cause to temporarily block) accesses to memory allocated in the enclosing malloc( ).

In all three scenarios, FIGS. 5-7, instead of allocating a new memory segment for B, the memory segment allocated for A can sometimes be reused. Two conditions must be satisfied to effect such an optimization. First, the size of memory segment A must be equal to or larger than that of B. It is noted that if the size of memory segment A is smaller than the size of B, an option would be to enlarge A's size, if the maximal size of the memory segment(s) allocated for B can be determined, perhaps using information obtainable only at runtime. Second, for scenarios 2 and 3, from the point where memory segment B is allocated, there must be no access—either read or write—to memory segment A. The second condition renders the memory segment A "dead" from B's point of view, which is equivalent to moving free (A) before B is allocated. In other words, scenarios 2 and 3 can be transformed into scenario 1, as long as the analysis, again, perhaps using information known only at runtime, can determine that there is no access to A after B is first modified.

The impact of this memory-allocation optimization is as follows:

When A and B are far apart in the program execution, retaining A's memory segment to be used later by B can increase the memory pressure during that interval.

Retaining A's memory segment means that the same cache lines will be referenced as opposed to frequent cache misses due to the allocation of B, especially if B is allocated in a loop, as shown in the following code snippet.

```
void foo(int a, int b) {
  int* A=malloc(sizeof(int));
  *A=a;
  printf("%d\n", *A);
  free(A);
  for (int i=0; i<100; ++i) {
    int* B=malloc(sizeof(int));
    *B=b;
    printf("%d\n", *B);
    free(B);
  }
}
```

Retaining A's memory segment means fewer calls to malloc and free.

Note that the analysis required for transforming scenarios 2 and 3 to scenario 1 closely resembles the variable liveness analysis, which determines the scope of a variable and can help in performing register allocation during machine code generation. Once it has been determined via liveness analysis that two variables' scopes do not intersect, the second variable can be stored using the same register that has been allocated for the first variable. Similarly, if it can be determined via liveness analysis that the life cycle of two memory segments does not intersect, the second memory segment can essentially be replaced by the first memory segment, that is, the first segment is reused.

Figure 8:
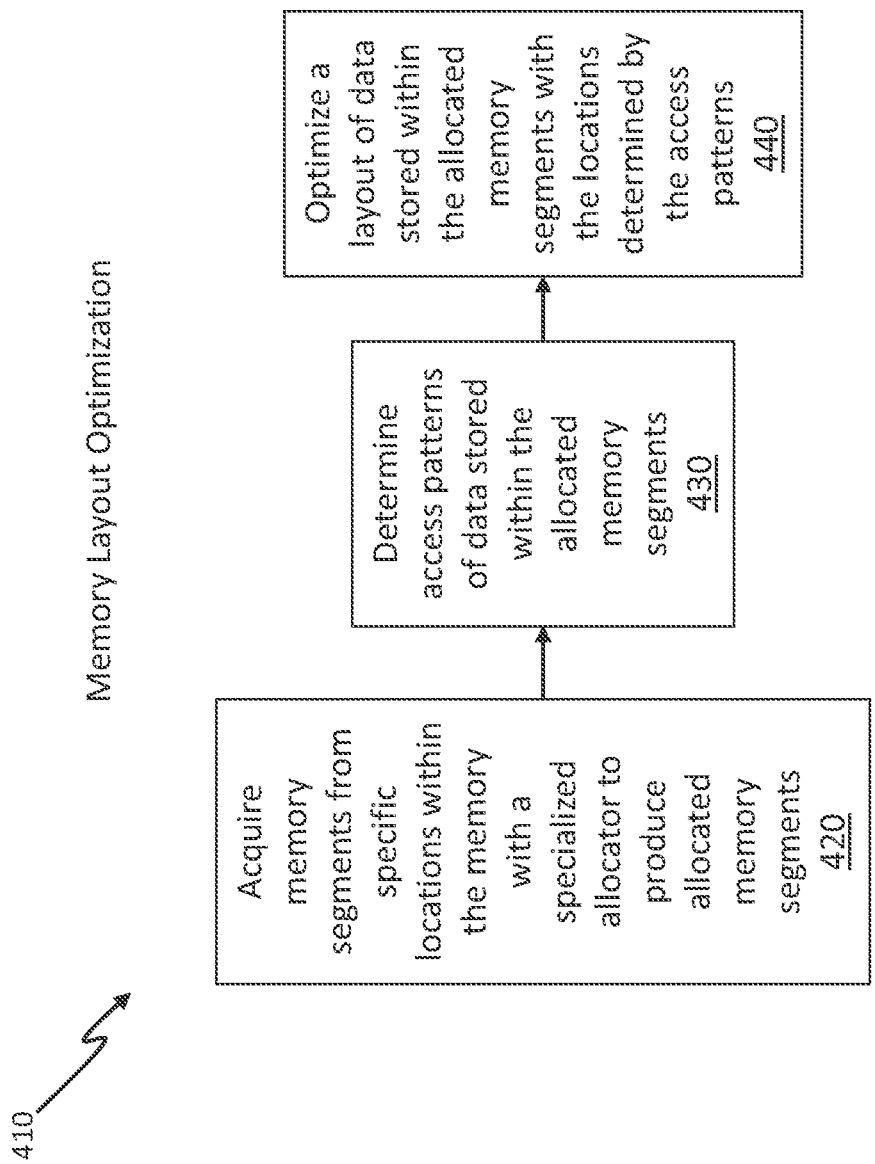
FIG. 8 is a diagrammatical illustration of the process of using a memory allocator to optimize memory layout, in accordance with a fifth exemplary embodiment of the present disclosure.

A fifth way to reduce memory stalls, and therefore achieve greater efficiency of in-memory processing by data-intensive applications, is to specialize the memory allocator to optimize memory layout. FIG. 8 is a diagrammatical illustration of the process of using a memory allocator to optimize memory layout 410, in accordance with a fifth exemplary embodiment of the present disclosure. As shown in FIG. 8, a specialized allocator may acquire memory segments from specific locations within the memory (block 420). Access patterns of data stored within the allocated memory segments may then be determined (block 430) and the layout of data stored within the allocated memory segments can be optimized with the locations determined by the access patterns to the stored data (block 440). An example from DBMSs is to allocate entries in a hash table carefully. Specifically, the hash values (which are often stored as a field member within a composite struct type) for the hash entries in the sets associated with the hash table buckets can instead be collected and then consecutively stored, allowing efficient access to these frequently-read values, thus reducing memory stalls.

It is noted that the approaches described within this disclosure may all utilize information available at runtime to generate specialized code that experiences fewer memory stalls and fewer memory allocation and deallocation operations within DBMSs and other data-intensive applications, thereby often resulting in substantial performance improvement, even when all the data is already available in main memory. Any of the approaches of this disclosure may be used individually or in any combination, all of which are considered within the scope of the present disclosure.

It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-implemented method of improving efficiency of cache memory in reducing memory access stalls and memory allocation requests in data-intensive applications stored on a memory storage device of a computer and accessing data stored on the memory storage device of the computer, the computer having a processor capable of executing computer executable instructions stored on the memory storage device, the method comprising:

using the processor of the computer, identifying invariant values of variables associated with execution paths of access data patterns in a main memory of the data-intensive application;

using the processor of the computer, applying at least one field specialization technique using at least one speccode segment tailored to runtime values of the identified invariant values of variables associated with the execution paths, wherein the at least one speccode segment is smaller and faster than an original unspecialized code associated with the execution paths; and using the cache memory, fulfilling data read and write requests to the main memory with the at least one speccode and not with the original unspecialized code associated with the execution paths to which the at least one speccode corresponds, thereby minimizing main memory access of the execution paths in the main memory of the data-intensive application, and thereby reducing at least one of memory stalls and memory allocation requests in the data-intensive application relative to original execution paths in the main memory of data-intensive application.

2. The method of claim 1, wherein the data-intensive application further comprises a database management system.

3. The method of claim 2, wherein the at least one field specialization technique comprises software prefetching.

4. The method of claim 3, wherein at least one of: a control-flow invariant value; and a number of cycles invariant value are identified.

5. The method of claim 3, further comprising inserting software prefetching instructions into the at least one speccode segment.

6. The method of claim 5, further comprising using at least one data prefetching hint to determine a prefetching level.

7. The method of claim 2, wherein the at least one field specialization technique comprises at least one of: a data distribution-based hash function; a CPU binding of processes; a memory segment reuse processes; or memory layout optimization.

8. A computer-implemented method of improving efficiency of cache memory in reducing memory access stalls and memory allocation requests in data-intensive applications stored on a memory storage device of a computer and accessing data stored on the memory storage device of the computer, the computer having a processor capable of executing computer executable instructions stored on the memory storage device, the method comprising:
using the processor of the computer, identifying invariant values of variables associated with execution paths of access data patterns in a main memory of the data-intensive application;
using the processor of the computer, applying at least one field specialization technique using at least one speccode segment tailored to runtime values of the identified invariant values of variables associated with the execution paths, wherein the at least one field specialization technique comprises software prefetching, wherein the at least one speccode segment is smaller and faster than an original unspecialized code associated with the execution paths;
inserting software prefetching instructions into the at least one speccode segment; and
using the cache memory, fulfilling data read and write requests to the main memory with the at least one speccode having the software prefetching instructions and not with the original unspecialized code associated with the execution paths to which the at least one speccode corresponds, thereby minimizing main memory access of the execution paths in the main memory of the data-intensive application, and thereby reducing at least one of memory stalls and memory allocation requests in the data-intensive application relative to original execution paths in the main memory of data-intensive application.

9. The method of claim 8, wherein at least one of: a control-flow invariant value; and a number of cycles invariant value are identified.

10. The method of claim 8, further comprising using at least one data prefetching hint to determine a prefetching level.

11. A computer-implemented method of improving efficiency of cache memory in reducing memory access stalls and memory allocation requests in data-intensive applications stored on a memory storage device of a computer and accessing data stored on the memory storage device of the computer, the computer having a processor capable of executing computer executable instructions stored on the memory storage device, the method comprising:
using the processor of the computer, identifying invariant values of variables associated with execution paths of access data patterns in a main memory of the data-intensive application;
using the processor of the computer, applying at least one field specialization technique using at least one speccode segment tailored to runtime values of the identified invariant values of variables associated with the execution paths, wherein the at least one field specialization technique comprises a data distribution-based hash function, wherein the at least one speccode segment is smaller and faster than an original unspecialized code associated with the execution paths;
transforming an input value used as a key by a hash table with at least one of: a complete value distribution hash function and a refined value distribution hash function; and
using the cache memory, fulfilling data read and write requests to the main memory with the at least one speccode and not with the original unspecialized code associated with the execution paths to which the at least one speccode corresponds, thereby minimizing main memory access of the execution paths in the main memory of the data-intensive application, and thereby reducing at least one of memory stalls and memory allocation requests in the data-intensive application relative to original execution paths in the main memory of data-intensive application.

12. The method of claim 11, wherein the complete value distribution hash function relies on a value distribution of all rows of a column of an underlying table upon which the hash table is built, and the refined value distribution hash function relies on a value distribution of a subset of all rows of the column of the underlying table upon which the hash table is built.

13. A computer-implemented method of improving efficiency of cache memory in reducing memory access stalls and memory allocation requests in data-intensive applications stored on a memory storage device of a computer and accessing data stored on the memory storage device of the computer, the computer having a processor capable of executing computer executable instructions stored on the memory storage device, the method comprising:
using the processor of the computer, identifying invariant values of variables associated with execution paths of access data patterns in a main memory of the data-intensive application;
using the processor of the computer, applying at least one field specialization technique using at least one speccode segment tailored to runtime values of the identified invariant values of variables associated with the execution paths, wherein the at least one field specialization technique comprises a CPU binding of processes, wherein the at least one speccode segment is smaller and faster than an original unspecialized code associated with the execution paths; and
using the cache memory, fulfilling data read and write requests to the main memory with the at least one speccode and not with the original unspecialized code associated with the execution paths to which the at least one speccode corresponds, thereby minimizing main memory access of the execution paths in the main memory of the data-intensive application, and thereby reducing at least one of memory stalls and memory allocation requests in the data-intensive application relative to original execution paths in the main memory of data-intensive application.

14. The method of claim 13, wherein the CPU binding of processes is dependent on:
   a presence of inter-process data transfer;
   a size of the inter-process data transfer.

15. A computer-implemented method of improving efficiency of cache memory in reducing memory access stalls and memory allocation requests in data-intensive applications stored on a memory storage device of a computer and accessing data stored on the memory storage device of the computer, the computer having a processor capable of executing computer executable instructions stored on the memory storage device, the method comprising:
   using the processor of the computer, identifying invariant values of variables associated with execution paths of access data patterns in a main memory of the data-intensive application;
   using the processor of the computer, applying at least one field specialization technique using at least one speccode segment tailored to runtime values of the identified invariant values of variables associated with the execution paths, wherein the at least one field specialization technique comprises a memory segment reuse processes, wherein the at least one speccode segment is smaller and faster than an original unspecialized code associated with the execution paths; and
   using the cache memory, fulfilling data read and write requests to the main memory with the at least one speccode and not with the original unspecialized code associated with the execution paths to which the at least one speccode corresponds, thereby minimizing main memory access of the execution paths in the main memory of the data-intensive application, and thereby reducing at least one of memory stalls and memory allocation requests in the data-intensive application relative to original execution paths in the main memory of data-intensive application.

16. The method of claim 15, wherein the memory segment reuse processes comprises:
   use memory access analysis to track all reads and writes to a memory segment;
   determine if there is a portion of a lifetime of the memory segment where it is not used;
   determine whether two memory allocations of the memory segment are adjacent during execution thereof;
   determine a size of the memory segment; and
   apply field specialization to reuse the memory segment.

17. A computer-implemented method of improving efficiency of cache memory in reducing memory access stalls and memory allocation requests in data-intensive applications stored on a memory storage device of a computer and accessing data stored on the memory storage device of the computer, the computer having a processor capable of executing computer executable instructions stored on the memory storage device, the method comprising:
   using the processor of the computer, identifying invariant values of variables associated with execution paths of access data patterns in a main memory of the data-intensive application;
   using the processor of the computer, applying at least one field specialization technique using at least one speccode segment tailored to runtime values of the identified invariant values of variables associated with the execution paths, wherein the at least one field specialization technique comprises memory layout optimization, wherein the at least one speccode segment is smaller and faster than an original unspecialized code associated with the execution paths; and
   using the cache memory, fulfilling data read and write requests to the main memory with the at least one speccode and not with the original unspecialized code associated with the execution paths to which the at least one speccode corresponds, thereby minimizing main memory access of the execution paths in the main memory of the data-intensive application, and thereby reducing at least one of memory stalls and memory allocation requests in the data-intensive application relative to original execution paths in the main memory of data-intensive application.

18. The method of claim 17, wherein memory layout optimization comprises:
   acquiring memory segments from specific locations within the cache memory with a specialized allocator to produce allocated memory segments;
   determining access patterns of data stored within the allocated memory segments; and
   optimizing a layout of data stored within the allocated memory segments with the locations determined by the access patterns.

* * * * *